United States Patent [19]

DeBergalis et al.

[11] Patent Number: 4,585,693
[45] Date of Patent: Apr. 29, 1986

[54] POLYMER-BOUND ULTRAVIOLET STABILIZER COATING COMPOSITIONS CONTAINING CROSS LINKERS

[75] Inventors: Michael DeBergalis; Robert P. O'Fee, both of Wilmington, Del.

[73] Assignee: E. I. Du Pont De Nemours and Company, Wilmington, Del.

[21] Appl. No.: 684,939

[22] Filed: Dec. 21, 1984

Related U.S. Application Data

[62] Division of Ser. No. 469,688, Feb. 25, 1983, Pat. No. 4,495,325.

[51] Int. Cl.[4] ............................ B32B 5/16; B32B 19/00
[52] U.S. Cl. ...................................... 428/324; 428/327; 428/328; 428/344; 428/457; 428/460; 428/463; 428/469
[58] Field of Search ............... 428/417, 418, 429, 463, 428/324, 327, 328, 344, 460

[56] References Cited

U.S. PATENT DOCUMENTS

| | | | |
|---|---|---|---|
| 2,970,066 | 1/1961 | Brasure | 117/33.3 |
| 3,113,907 | 12/1963 | Tocker | 428/336 |
| 3,288,880 | 11/1966 | Tocker | 260/828 |
| 3,328,491 | 6/1967 | Fertig et al. | 260/901 |
| 3,340,231 | 9/1967 | Fertig et al. | 260/47 |
| 3,341,493 | 9/1967 | Goldberg et al. | 260/47 |
| 3,365,421 | 1/1968 | Horton et al. | 260/47 |
| 3,418,397 | 12/1968 | Tocker | 260/900 |
| 3,429,852 | 2/1969 | Skoultchi | 260/47 |
| 3,441,545 | 4/1969 | Blatz et al. | 260/78.5 |
| 3,444,129 | 5/1969 | Young et al. | 528/176 |
| 3,445,423 | 5/1969 | Sunshine et al. | 260/45.85 |
| 3,445,566 | 5/1969 | Skoultchi | 424/47 |
| 3,595,602 | 7/1971 | Oppelt et al. | 8/74 |
| 3,652,492 | 3/1972 | Kamogawa et al. | 252/600 |
| 3,849,373 | 11/1974 | Siegle et al. | 525/328.2 |
| 3,956,269 | 5/1976 | Sheppard et al. | 260/192 |
| 4,208,465 | 6/1980 | Chang | 428/416 |
| 4,210,612 | 7/1980 | Karrer | 525/204 |
| 4,278,804 | 7/1981 | Ashby et al. | 556/436 |
| 4,294,949 | 10/1981 | Karrer | 526/262 |
| 4,308,362 | 12/1981 | Wiezer et al. | 525/328 |
| 4,310,650 | 1/1982 | Gupta et al. | 526/313 |
| 4,328,346 | 5/1982 | Chung et al. | 548/110 |
| 4,355,071 | 10/1982 | Chang | 428/334 |
| 4,362,895 | 12/1982 | Gupta et al. | 136/256 |
| 4,372,835 | 2/1983 | Chung et al. | 204/159.13 |

*Primary Examiner*—Theodore E. Pertilla

[57] ABSTRACT

Coating compositions containing large amounts of polymer-bound ultraviolet radiation stabilizers and cross linkers give highly ultraviolet absorbent properties.

1 Claim, No Drawings

POLYMER-BOUND ULTRAVIOLET STABILIZER COATING COMPOSITIONS CONTAINING CROSS LINKERS

This is a division of application Ser. No. 469,688, filed Feb. 25, 1983, U.S. Pat. No. 4,495,325 issued Jan. 22, 1985.

BACKGROUND

This invention involves polymer-bound ultraviolet, absorbing stabilizers. More particularly, it involves the use of such stabilizers in coating compositions.

Many types of organic compositions, including coating, fibers, films, moldings and dyes, are sensitive to and degraded by ultraviolet radiation. The usual source of such radiation is sunlight, although fluorescent and arc lamps also provide more or less.

Various means are used to minimize the deleterious effects of such degradation. Ultraviolet absorbing stabilizers absorb the ultraviolet radiation and ultimately convert it largely to heat at low enough levels that the heat is much less deleterious than the radiation. Some may also be converted to less deleterious types of radiation such as visible light. Ultraviolet sensitizers also absorb ultraviolet radiation but use it generally to generate free radicals which can be useful in initiating cross linking in specifically tailored systems but which are normally thought of as degradative or deleterious in most organic compositions. Radical quenchers serve as traps for free radicals generated by ultraviolet degradation in a degradative process and thus tend to slow or stop the propagation of undesired effects. Antioxidants retard oxidation of organic compositions and thereby minimize the secondary effect of oxidation by which ultraviolet degradation does much of its damage.

Ultraviolet absorbing stabilizers and sensitizers can both be said to be ultraviolet absorbers, but the former are good for preserving the integrity of an organic composition while the latter promote change. Free radical quenchers and anti-oxidants operate at a secondary level to minimize damage from free radicals and other effects caused by ultraviolet radiation, heat, ozone or other causes.

Ultraviolet absorbing stabilizers are generally monomeric, although they are sometimes provided as oligomers or with bound groups which increase the molecular weight. Increased molecular weight and the presence of reactive groups can minimize the problem caused by mobility of the unmodified stabilizer. As used in a coating, film or other organic body, an unmodified stabilizer may tend to exude from the body and bloom on the surface or even evaporate at an undesirable rate.

The use of dihydroxy benzophenone bound into an acrylic copolymer through glycidyl methacrylate and optionally blended with other polymers as a coating composition is disclosed in U.S. Pat. Nos. 3,328,491—Fertig, et al; 3,340,231—Fertig, et al; 3,341,493—Goldberg, et al; (all 1967); 3,288,880—Tocker (1966); 3,365,421—Horton, et al (1968); and 3,445,566—Skoultchi, et al (1969). Advantages mentioned include decreased migration of the ultraviolet stabilizer and improved compatability and stability. The dihydroxy benzophenone or a derivative of it is reacted first with glycidyl methacrylate or a derivative of it, and this reaction product is either homopolymerized or copolymerized with other acrylic monomers. Other polymers taught for blending into the paint include polystyrene, polypropylene, polyvinyl fluoride and chloride, vinyl chloride/vinylidene chloride copolymers, polymethyl methacrylate, isoprene, vinyl acetate and cellulosics.

Urethane polymers have been light-stabilized by incorporating into the prepolymer solution 4-amino- or 4-(3-aminopropyl)amino-2,2,6,6-tetramethylpiperidine, as disclosed in German Offenlegungsschrift Nos. 2,642,374—Pfahler, et al (1979) and 2,642,386—Oertel, et al (1976), or bis(2,2,6,6-tetramethyl-4-piperidinyl)-sebacate, as disclosed in German Offenlegungsschrift 2,820,419—Thomas (1978).

The effectiveness of 2,2,6,6-tetraalkylpiperidines as ultraviolet light stabilizers also is evident in the art as disclosed in German Offenlegungsschrift No. 2,748,362—Oertel, et al (1978) and by F. E. Karrer, Makromol. Chem. 181, 595–633 (1980), where in such disclosures the stabilizer is incorporated into a free radical polymerizable monomer. The stabilizer-containing monomer, for example, 2,2,6,6-tetramethyl-4-piperidyl acrylate can be homopolymerized or copolymerized with appropriate free radical copolymerizable monomers to provide polymers having improved light stability. Similar disclosures of acrylate and methacrylate monomers which contain heterocyclic groups and which are polymerizable to polymers exhibiting light stability are made in U.S. Pat. Nos. 4,210,612 (1980) and 4,294,949 (1981)—both to Karrer.

However, such ultraviolet non-absorbing stabilizers as piperidine derivatives, whether polymer-bound or not, generally are highly polar and may fail to give water resistance to coatings. Furthermore, since they act on the indirect effects of ultraviolet degradation, they can only be effective throughout the bulk thickness of a coating rather than being able to concentrate their effects at the surface as can absorbing stabilizers.

U.S. Pat. No. 4,308,362—Wiezer, et al (1981) discloses copolymers having repeat units of maleic or fumaric acid ester or amide, the ester or amide groups of which include alkylpiperidine moieties. The alkylpiperidine moieties impart light stability to the polymers. The light stabilizing portion of the polymer is characterized by low volatility, good migration stability and good compatibility with the substrate polymer to which the light stability characteristic is to be imparted. Azo and peroxy free radical initiators containing ultraviolet light stabilizing groups and their use in preparing free radical initiated polymers which exhibit ultraviolet light stability are disclosed in U.S. Pat. No. 3,956,269—Sheppard, et al (1976). Numerous types of ultraviolet light stabilizing compounds, incorporated into the free radical initiator, are disclosed, for example, phenyl salicylates, o-hydroxybenzophenones, cyanoacrylates, benztriazoles and resorcinol monobenzoate. One problem with incorporating ulltraviolet absorbing stabilizers in a polymer by bonding them to the polymerization initiator such as azo and peroxy initiators is that this approach inherently limits the percentage of stabilizers that can be incorporated at usefully high molecular weights. Sheppard, et al do not mention higher levels than 10% by weight of stabilizer in a coating, and they do not use more than 2 mers of stabilizer in a polymer molecule.

U.S. Pat. No. 3,429,852—Skoultchi (1969) teaches ethylenically-unsaturated benzophenone sensitizer acrylic copolymers which can be used to provide cross linking in a paint film.

U.S. Pat. No. 2,970,066—Brasure (1961) discloses urethane polymers with ultraviolet stabilizers including dihydroxy benzophenone and aryl homologs of methyl beta-resorcylate, including reacting the stabilizer with an isocyanate prepolymer, and perhaps leaving some reactive isocyanate groups in the reacted polymer.

U.S. Pat. No. 3,441,545—Blatz, et al (1969) discloses reacting ultraviolet stabilizers including dihydroxy benzophenone and stabilizer precursurs including resorcinol monobenzoate with various prepolymers through an acid halide group. While useful for various purposes including some types of coatings, residual halides could cause difficulties in some end uses.

U.S. Pat. Nos. 4,310,650 and 4,362,895, both to Gupta, et al (1982), disclose acrylic-benzophenone stabilizer copolymers with residual double bonds, having no crosslinkers and a maximum of 5% stabilizer, and being copolymerized in a single step. (Parts, percentages and proportions herein are by weight except where indicated otherwise.)

Also, Chang's U.S. Pat. Nos. 4,208,465 (1980) and 4,355,071 (1982) teach that 1–20% of ultraviolet stabilizers can be used, based on paint solids, and his European Patent Publication No. 29595 (1981) teaches glycidyl acrylic polymers with melamine cross linkers and with ultraviolet stabilizers. However, his stabilizers are not polymer bound.

The above-mentioned patents are incorpoated herein by reference.

The usual approach to ultraviolet stabilization is to use strongly absorbent stabilizers in low concentrations such as 0.5–3% of the total composition such as hydroxy phenyl benztriazoles including Tinuvin 328 sold by Ciba Geigy. Higher concentrations have been generally thought to be uneconomical because of the high cost of the stabilizer and unstable because of mobility.

However, the present invention involves the discovery that certain types of ultraviolet absorbing stabilizers which need not have outstanding efficiency can be used in relatively high concentrations when chemically attached to a polymeric binder as a substantial part of the composition being protected.

This permits making a thin paint layer or a thin film which is quite opaque to ultraviolet radiation but which does effectively transmit visible light. This concept can be used advantageously in many applications, such as: an outer clear layer of paint over other paint layers, some of which may be pigmented; a coating on fibers or fabrics which may contain ultraviolet sensitive dyes or other constituents, coatings or films for glass to minimize ultraviolet penetration through the glass; coatings for wood or plastics; coatings, films or bulk additives in molding resins used as refractors or housings for fluorescent or arc lamps such as high pressure mercury arc lamps; hair spray to minimize sun bleaching or discoloration of hair colorants, as in U.S. Pat. No. 3,445,566—Skoultchi (1969); coatings for color photographs; and other potential applications.

The present invention seems particularly useful for a thin unpigmented clear coat to be used as the top layer of an automobile finish system which may have one or more pigmented layers over a primer, topped by one or more clear layers to enhance the aesthetics of the car, giving a higher gloss.

The present invention can provide an outer clear coat in an automotive color coat/clear coat finish system that will give strong enough ultraviolet stabilization to localize the degradation in the outer regions of the surface. Instead of intercoat adhesion failure and flaking off of the outer layers, as sometimes occurs with color coat/clear coat finishes, this can change the mode of aging to slow, minor chalking of the surface. Gloss can remain high with the refractive indices of the constituents chosen properly, and polishing can repair the effects of this type of aging.

SUMMARY OF THE INVENTION

The present invention provides a coating composition containing an ultraviolet stabilizer polymer which absorbs ultraviolet radiation and dissipates it largely as heat, comprising the reaction product of, by weight, about 12.5–50%, preferably at least 20%, of a first moiety which absorbs ultraviolet energy and the balance being a second moiety bonded to said first moiety, said coating composition containing a cross-linking species which aids in cure of coatings by cross linking, said cross-linking species being capable of cross linking with said polymer. The coating composition preferably contains at least about 12.5% by weight of the first moiety.

Preferably the cross-linking species is an amine, a melamine formaldehyde, an isocyanate or an oxidatively curing group.

Films and coating compositions containing liquid carriers, either aqueous or based on organic solvents, as well as dry powder coating compositions, are also part of the invention.

Preferably, in coating compositions the stabizer polymer has a number average molecular weight about in the range of 3,000–10,000, more preferably in the range of about 8,000–10,000, and the polymer contains on the average at least 0.8 mers of said first moiety per molecule, more preferably at least about 2.1 mers, most preferably at least about 7.5 mers. Preferably, the polymer of the coating composition contains by weight, about 15–80% said first moiety, it has a number average molecular weight about in the range of 3,000–10,000 and it contains at least about 2.1 mers of said first moiety per molecule.

The invention is particularly useful in providing a substrate having a multilayer coating wherein the outer layer is an unpigmented cured coating of the invention and at least one inner layer contains at least one of pigments, mica, pigment-coated mica flake and metallic flake.

DETAILED DESCRIPTION

There are two basic types of paints, lacquers and enamels. Lacquers cure by drying. As the solvents and other liquid carriers evaporate, the paint solids coalesce to form a film which may involve interlocking matrices of one or more resins. An enamel, in contrast, involves cross linking in the cure. The cross linking can be within the main resin itself. More often it involves separate cross linking resins which react with the main resin.

The present invention involves high concentrations of polymer-bound ultraviolet stabilizers in enamel paints which contain cross linkers. There are two important differences between lacquers and enamels. Enamels undergo chemical reactions after application, and extraneous additives that might interfere with such reactions are generally undesirable. Also, the molecular weight of the enamels are generally lower than those of lacquers.

It can be more difficult to formulate an enamel than a lacquer. Enamel resins may need to be synthesized under conditions that would degrade ultraviolet stabilizers. For instance, low molecular weights are needed for high solids enamels, and relatively high temperature polymerization must be used. Thus, it has been found in connection with this invention that in some cases, post-reacting the stabilizers with a prepolymer permits the polymerbinding of stabilizers in enamels that would be more difficult if possible with stabilizers pre-reacted with the monomers of the enamel before polymerization.

Although many types of ultraviolet stabilizers can be used in the present invention, including both more and less efficient stabilizers, the following stabilizers ar particularly useful in the invention:

resorcinol monobenzoate

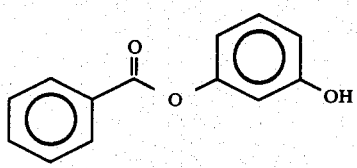

dihydroxy bensophenone

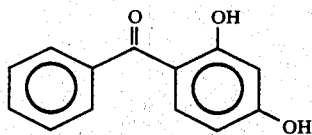

2-hydroxy, 4-hydroxyethoxy benzophenone (R=OH)
2-hydroxy, 4-amino ethoxy benzophenone (R=NH₂)

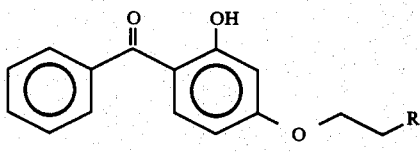

R = OH or NH₂ phenylsalicylate

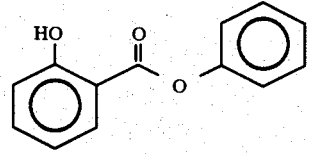

4-aminophenyl salicylate

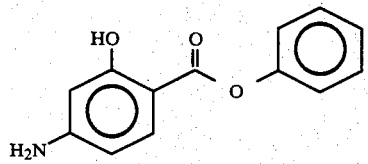

2-(2,4 dihydroxypheny)-benztriazole

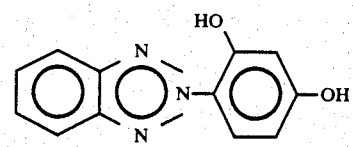

As is known, the ultraviolet stabilization effect of dihydroxy benzophenone involves interaction of the carbonyl between the rings with the hydroxyl group shown at the top of the right-hand ring, in the position ortho to the carbonyl. Since the bonding of the resorcinol monobenzoate is through the hydroxyl group, that group remains bound to the polymer in the dihydroxy benzophenone resulting from the photorearrangement. By the term "derivatives containing resorcinol monobenzoate" is meant compounds or reaction products in which the resorcinol monobenzoate retains its character and effect in performing its function in the present invention. For instance, functionalized groups of up to 14 or even more carbon atoms could be reacted with the hydroxyl, so long as the resulting product can bond effectively with the defined polymer. Although such derivatives may be used in the present invention, for maximum cost effectiveness under present circumstances, resorcinol monobenzoate itself is prepared.

Derivatives of resorcinol monobenzoate under the present invention include the following which are made by reaction with the hydroxyl group on the resorcinol monobenzoate:

3-(1,2 epoxy propyl)-resorcinol monobenzoate

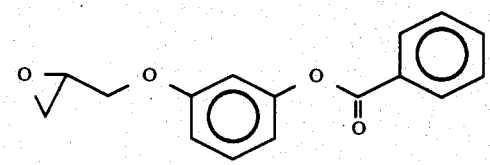

3-(1-hydroxyethyl)-resorcinol monobenzoate

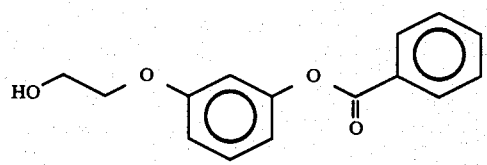

3-(1-aminoethyl)-resorcinol monobenzoate

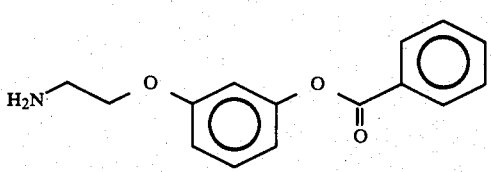

3-(trimellitic anhydrido)-resorcinol monobenzoate

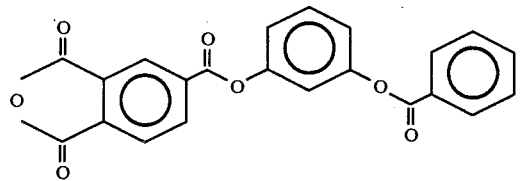

2-vinyl-resorcinol monobenzoate

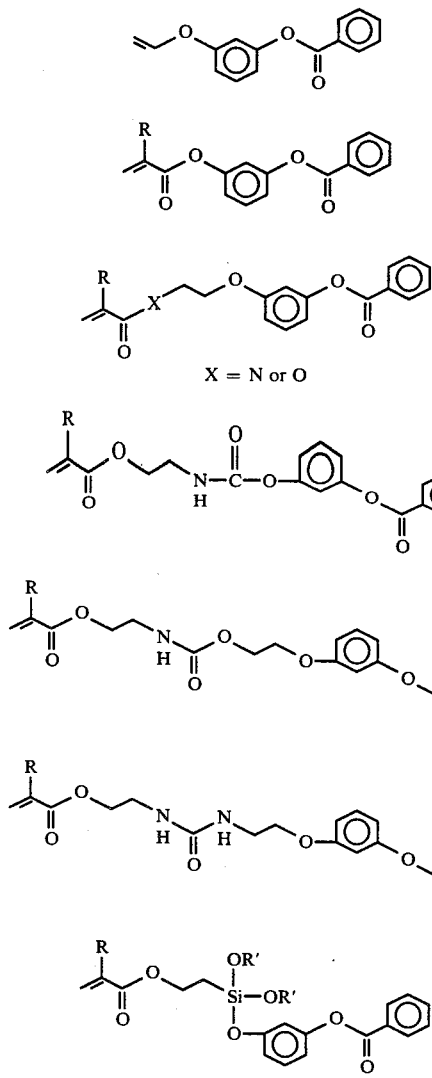

where
R=H or methyl
R'=methyl or ethyl
3-(chloroformoyl)-resorcinol monobenzoate

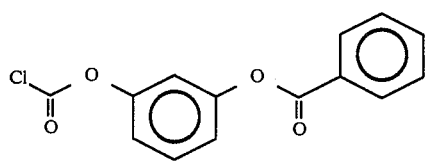

Further derivatives fit the structure

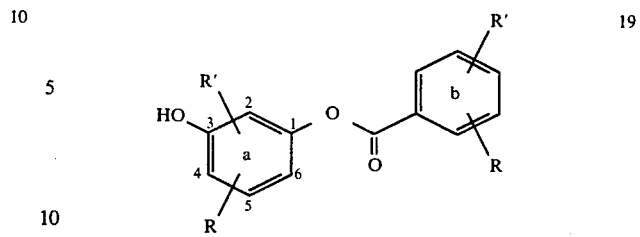

wherein R and R' are hydrogen or hydrocarbons of $C_1-C_{14}$, with or without reactive functionalities including halogen, oxygen, aromatics, amine and combinations of the above. Further, the disposition of this functionality must be such so as to allow at least one unsubstituted ortho position (2 or 6) on the a ring.

Corresponding limits apply to derivatives of dihydroxy benzophenone and other ultraviolet stabilizers. It will be apparent to the person skilled in the art with little or no experimentation that certain types of compositions can qualify as derivatives for any given type of stabilizer.

Being more swellable than enamels, lacquers generally can tolerate more plasticizer and other additives than enamels. Crosslinked enamel films are less swellable and generally cannot tolerate as high levels of additives as can lacquers. Thus, it is less to be expected that enamels could utilize high levels of ultraviolet stabilizers in accordance with the invention than if lacquers were involved.

In films, crosslinking can be used in at least two stages: first to form the coherent film itself; second to change the character of the film in use, such as to harden or shrink the film after it has been wrapped around an object.

Other adjuvants may be used in compositions of the invention so long as they do not harm the basic and novel characteristics of the invention. Auxiliary ultraviolet-active ingredients may be used as is often done in conventional paints, such as hindered amine light stabilizers or quenchers and phenolic antioxidants. Pigments, especially light transmitting pigments of desirable refractive index, may aid in chalking and polishability. Coating compositions may be formulated with additional resins for desired effects.

Polymers for use in the present invention containing glycidyl methacrylate can be prepared by methods reported in the literature. Such polymers having a number average molecular weight between 1500 and 45,000, preferably 2,000–10,000 for high solids enamels, can then be reacted with ultraviolet stabilizers which contain reactive functionality such as amine, hydroxyl or acid groups. The desired amounts of ultraviolet stabilizers can be incorporated into the polymer backbone by an amine, ether or ester linkage, depending upon the starting functionality, via the epoxy groups of the glycidyl methacrylate. The amount of ultraviolet stabilizers can be varied depending upon (1) the desired level of ultraviolet fortification, (2) the amount of residual epoxy desired for crosslinking. The amount of ultraviolet stabilizers incorporated can be varied between 12.5 and 50% by weight on total polymer solids, with the desired range being between 20 and 50%. The incorporation reaction occurs at temperatures between 80° and 130° C. with the desired range between 100°–110° C.

Reaction time is from 4–12 hours with the optimum range being 6–8 hours.

Modified acrylic copolymers of the invention optionally can then be crosslinked using conventional crosslinkers such as melamines, isocyanates, phenolics, alkyds or other air dry systems, or preferably various di-, tri-, tetra- and poly-functional amines, either monomeric or polymeric. Particularly suitable amines include, methylene dicylohexyl 4,4' diamine, and other cycloaliphatic or aromatic diamines such as Ancamine 1618 sold by Pacific Anchor Inc., 1,6 hexanediamine, hexamethoxy methyl melamine or polyamine resins such as methyl methacrylate/lauryl methacrylate/methacrylic acid/propylene imine in weight ratios such as 40/48/12/4.3 (PI stoichiometric with the MAA) at 43% solids with 1.39 milliequivalents of amine per gram of solid polymer. Alternatively, crosslinking can be done with isocyanates, either monomeric such as Desmodur N sold by Mobay, or polymeric such as styrene/butyl methacrylate/isocyanato ethyl methacrylate/N-dodecyl mercaptan in weight ratios such as 42.2/10/46/0.08. The molar ratio of crosslinker to acrylic is adjusted to give a stoichiometry between 1.0:1 and 4.0:1 with the desired range being between 1.0:1 and 3.0:1.

Such films will cure at ambient temperature, or above, depending on the crosslinker system, to give films with high gloss measured on a Glossmeter made by Lockwood McLarie of Horsham, Penn., of between 80 and 115 at a 20° angle and a hardness of 4-20 Knoop and good toughness. Lower hardnesses are also desirable and obtained for certain purposes. Further, these coatings show pronounced ultraviolet stability lasting from greater than 2,000 hours to greater than 19,000 hours in QUV testing with between 70 and 93% gloss retention, depending on the coating system. These coatings can be applied to a variety of substrates including painted surfaces, wood, plastics, glass, metal, and organic films.

EXAMPLE 1

Typical Preparations

An acrylic prepolymer with epoxy groups is produced from the following ingredients butylacrylate/hydroxyethylacrylate/clycidyl methacrylate in weight ratios of 49/4/37.

The prepolymer is made by standard vinyl polymerization techniques. Thus, the above monomers are combined with 0.5-7% of a free-radical initiator. This mixture is fed into a solvent (e.g., 2-heptanone) held at a controlled temperature to yield the solution polymer.

The above prepolymer is then combined and reacted with enough 2,4-dihydroxy benzophenone or resorcinol monobenzoate to yield a polymer containing 20-50% ultraviolet stabilizer. This reaction can be catalyzed, but the preferred method is uncatalyzed. The reaction is held at a temperature in the range 100°-175° C. so that excessively long reaction times and deleterious side reactions are avoided.

A typical enamel can be made by blending
50-80 parts acrylic ultraviolet stabilizing resins
20-50 parts hexamethoxymethylmelamine
0.1-10 parts p-toluenesulfonic acid catalyst
0-50 parts pigment and/or metallic flake
20-400 parts solvent These enamels are applied in a conventional manner such as air atomized spray and baked for 30 minutes at 120° C. to yield a hard glossy finish.

More specific preparations are given in the following examples.

EXAMPLE 2

Acrylic Prepolymer

To 1237.2 g of refluxing methyl amyl ketone (MAK) was added a solution of 834.4 g glycidyl methacrylate, 1100.0 g n-butyl acrylate, 300.0 g hydroxyethylacrylate, 125.21 g methyl amyl ketone and 62.6 g Lupersol 70 (a 75% solution of t-butyl peracetate sold by Pennwalt) over 225 minutes. Following this feed, a solution of 62.6 g Lupersol 70 in 8.0 g MAK was added over 15 minutes. After 30 minutes of additional reflux, the resin was cooled yielded a 62% solids prepolymer.

EXAMPLE 3A

Resorcinol Monobenzoate Resin

To 32.2 g of the refluxing prepolymer was added 11.26 g (0.0526 mol) resorcinol monobenzoate. This mixture was refluxed until reaction was complete about 3 hours. This yielded a 72% solids resin containing 36.1% resorcinol monobenzoate on resin solids.

EXAMPLE 3B

Dihydroxybenzophenone Resin

The above procedure for the resorcinol monobenzoate resin was followed exactly except that 11.26 g 2,4-dihydroxybenzophenone was substituted for the resorcinol monobenzoate. The reaction yielding a 72% solids resin containing 36.1% dihydroxybenzophenone on resin solids.

EXAMPLE 4

Clear Enamels

Clear enamels were formulated by mixing 9.83 g of the resorcinol monobenzoate or the dihydroxybenzophenone resins, 3.0 g Resimene 755, a fully alkylated melamine formaldehyde resin sold by Monsanto, 0.06 g 50% p-toluene-solfonic acid monohydrate in methanol, and 3.84 g xylene. The enamels were applied to metal substrates that were precoated with a conventional silver metallic automotive enamel. The clear enamels were cured in a 121° C. oven for thirty minutes.

EXAMPLE 5

Accelerated Weathering

A QUV weathering tester made by Q Panel Company was used with an 8 hour 70° C. light cycle, and a 4 hour, 50° C. wet cycle. The formulations tested were:
A: The resorcinol monobenzoate enamel described in Example 4.
B: The dihydroxybenzophenone enamel described in Example 4.
C: A clear enamel similar to A and B but containing no ultraviolet stabilizer.
D: Enamel C containing 3% Tinuvin 328, an ultraviolet stabilizer sold by Ciba Geigy.

The results are reported in 20% gloss. A result of 100 is best.

| QUV Hours | B | A | C | D |
| --- | --- | --- | --- | --- |
| 0 | 100 | 100 | 80 | 86 |
| 550 | 96 | 87 | 84 | 88 |
| 1100 | 95 | 89 | 77 | 82 |
| 1260 | 95 | 87 | 52[1] | 81 |

| QUV Hours | B | A | C | D |
|---|---|---|---|---|
| 1730 | | | 1 | 32 |
| 1880 | | | | 11 |
| 2780 | 81 | 79 | | |
| 5460 | 73 | 57 | | |

[1] The enamel surface is cracked.

EXAMPLE 6

Proposed Preparation of a Copolymerizable Resorcinol Monobenzoate Monomer

To a 200 ml 4 neck round bottom flask equipped with a reflux condenser, nitrogen inlet, mechanical stirrer and addition funnel add resorcinol monobenzoate, 21.42 g (0.1 moles), triethylamine, 10.11 g (0.1 moles) and 40 ml of dry tetrahydrofuran. Allow this mixture to stir for 30 minutes whereupon methacryloyl chloride, 10.75 g (0.1 moles) in 25 ml of dry tetrahydrofuran is added dropwise over 30 minutes. The reaction is allowed to continue until all starting material is consumed, as determined by thin layer chromatography. At this point the reaction mixture is diluted with ethyl ether, 1,500 ml, and washed 3 times with 100 ml of 10% HCl, water and brine. The ethereal fraction was dried over magnesium sulfate and concentrated to give the desired methacryloyloxy resorcinol monobenzoate. Theoretical yield: 28.3 g. Since the methacryloyl chloride is monomeric, it is relatively easy to dispose of the halide residues. It would be much more difficult if a polymeric acyl halide were provided as a reactant.

EXAMPLE 7

Preparation of Acrylic Epoxy Prepolymer

To a 3l 4-neck round bottom flask equipped with a reflux condenser, mechanical stirrer, two addition funnels, temperature probe and nitrogen inlet was added 1200 g of toluene. The solvent was brought to reflux temperature and the monomer and initator feeds were begun. The monomer feed of methyl methacrylate, 300 g; butyl methacrylate, 600 g; and glycidyl methacrylate, 600 g, was added over 3 hours while the initiator feed of VAZO-67, 30 g, an azobis isobutyronitrile polymerization initiator sold by Du Pont, and toluene, 150 ml, was added over 3.5 hours. After complete addition, the polymer solution was held at reflux temperature for an additional hour and then cooled to room temperature. The final resin solution contained 54% solid polymer. Gel Permeation Chromatography shoed the resin to have a number average molecular weight ($M_N$) of 8800 and a weight average molecular weight ($M_w$) of 20,000.

EXAMPLE 8

This example is representative of the post reaction sequence for the attachment of the ultraviolet stabilizer to the acrylic prepolymer.

A 1 liter 4 neck round bottom flask, equipped with a reflux condenser, mechanical stirrer, temperature probe and nitrogen inlet was charged with 300 g of the acrylic polymer described in Example 7, 63 g of resorcinol monobenzoate or a 50-50 blend with 2,4 dihydroxybenzophenone, 56 ml of tetrahydrofuran and 0.1 g of Irganox 1010, a hindered phenolic antioxidant sold by Ciba Geigy. The reaction mixture was heated at reflux for six hours and then cooled to room temperature. The resin which contained 25% of the ultraviolet stabilizer, resorcinol monobenzoate or 2,4 dihydroxybenzophenone, was a clear, slightly yellow resin solution. Acrylic polymers containing higher or lower percentages of ultraviolet stabilizer can be prepared in an analogous manner by adjusting the amount of stabilizer added to the prepolymer. Further, blends of the ultraviolet stabilizers can also be added in a like manner. For instance for a resin containing 20% of the stabilizer, instead of 63 g of stabilizer, 31.5 g of either or half of each can be used.

EXAMPLE 9

300 g of acrylic resin described in Example 7 was added to a 1 liter 4 neck round bottom flask equipped with a mechanical stirrer, reflux condenser, temperature probe and nitrogen inlet. The resin was brought to reflux temperature and treated with 100.3 g of either resorcinol monobenzoate or a 50-50 blend of resorcinol monobenzoate and 2,4 dihydroxybenzophenone in 50 g of tetrahydrofuran. The reaction mixture was heated at reflux temperature for six hours and then cooled. The acrylic polymer which contained 37% of the ultraviolet stabilizer(s) by weight of polymer solids was a clear, slightly yellow solution.

EXAMPLE 10

This example demonstrates the procedure for cross-linking and forming clear films/coating with the acrylic polymers described in Example 8

The acrylic polymer described in Example 8 can be crosslinked and formed into a clear film or coating by blending 1-1.7 g of Ancamine ® 1618, a cycloaliphatic amine crosslinking agent sold by Pacific Anchor Co., with 15 g of the acrylic polymer described in Example 8. For application, the above-mentioned blend is diluted to the desired viscosity with a solvent mixture of toluene/xylene/Cellosolve acetate, an ethylene glycol monoethyl ether acetate sold by Union Carbide, and 0.1 g of Irganox 1010, a hindered phenolic antioxidant sold by Ciba Geigy. The finish can then be applied by spray or brush to the desired surface and allowed to cure at ambient temperature or baked at 82° C. for 30 minutes. Ambient cured systems give solvent resistant films after 3 days and baked systems after cooling to room temperature. Both baked and ambient cured films give outstanding durability as shown by 90% retention of 20° gloss after more than 2,000 hours in QUV testing.

EXAMPLE 11

This example demonstrates the procedure for crosslinking and forming clear films/coatings with acrylic polymers described in Example 9.

The ultraviolet stabilized acrylic polymer described in Example 9 can be crosslinked and formed into a clear film/coating by blending 4.2-5 g of Desmodur-N, a polyfunctional isocyanate crosslinker sold by Mobay with 10 g of the acrylic polymer described in Example 9. For application, the mixture of the acrylic polymer and the isocyanate crosslinker is diluted with toluene/xylene/Cellosolve Acetate sold by Union Carbide (50/40/10) and 1% dibutyltin dilaurate to the desired viscosity and applied by spray or brush to the substrate. The coating can subsequently be baked at 82° C. for 30 minutes or allowed to cure at ambient temperature. Ambient cured films become solvent resistant after 5 days while baked systems are resistant after cooling. Both baked and ambient cured films show good durability maintaining 90% of their gloss after 1,000 hours in QUV testing.

EXAMPLE 12

The acrylic resin for Example 9 can also be cross-linked and formed into clear films or coatings by blending 1 part of the acrylic polymer with 2 parts of polymeric isocyanate such as methyl methacrylate/butyl methacrylate/isocyanatoethyl methacrylate/n-dodecylmercaptan (42.2/0.8/48/10) having an $M_n$ of 2,000 at 54% solids. Application is accomplished in an analogous manner to Example 11. 1% dibutyltin dilaurate added as catalyst.

EXAMPLE 13

This example demonstrates the preparation and formation of a clear, ultraviolet absorbing coating which oxidatively cures using linoleic acid esters.

300 g of the prepolymer from Example 7 was charged to a 1 liter 4 neck round bottom flask equipped with a mechanical stirrer, reflux condenser, nitrogen inlet and addition funnel. The resin solution was heated to reflux temperature and 66.5 g of resorcinol monobenzoate was added in 50 g of tetrahydrofuran. The reaction was allowed to proceed at reflux for 6 hours. Next, linloeic acid was added dropwise over one hour and upon complete addition the reaction mixture was allowed to reflux for an additional hour and cooled.

A clear film/coating can be formed by diluting the above polymer with an appropriate solvent blend along with 1% cobalt naphthenate to induce crosslinking. The resin can then be applied to the substrate by spraying or brushing.

FURTHER PREFERENCES

Preferably the first moiety is bonded to the second moiety through a functional group in the second moiety which is a group other than an isocyanate and also preferably other than a polymeric acyl halide. More preferably the group is at least one group selected from epoxy, amine, alcohol, ester, carboxylic acid and anhydride, ketone, aldehyde, aziridine, oxazoline, alkyl halide, $\beta$-alkoxy amide, hemi-aminal, alkoxy aminal, alkoxy silane, lactone, $\alpha,\beta$-unsaturated carbonyl groups and phosphoric acid derivatives. Most preferably for some usages the group is the epoxy group in glycidyl methacrylate.

We claim:

1. A substrate coated with a cured coating of a coating composition containing an ultraviolet stabilizer polymer which absorbs ultraviolet radiation and effectively dissipates the resulting energy as heat, but which does not contain effective amounts of ultraviolet sensitizer, said polymer of said coating composition comprising, by weight 12.5-50% of a first moiety which absorbs ultraviolet energy, said first moiety being bound to a polymeric second moiety to produce said ultraviolet stabilizer polymer containing, by weight, 12.5-80% of said first moiety, said coating composition also containing a cross-linking species which aids in cure of said coating by cross linking with said stabilizer polymer, said cured coating being a multilayer coating wherein the outer layer is unpigmented and at least one inner layer contains at least one of pigments, mica, pigment-coated mica flake and metallic flake.

* * * * *